Feb. 20, 1968   M. KIMPFLINGER ET AL   3,369,429
MULTIPLE SPEED HUB WITH AUTOMATICALLY
VARYING TRANSMISSION RATIO
Filed Nov. 29, 1962

INVENTORS
Max Kimpflinger
Hans Joachim Schwerdhöfer
By
Richard Low
Agt

United States Patent Office 3,369,429
Patented Feb. 20, 1968

3,369,429
MULTIPLE SPEED HUB WITH AUTOMATICALLY VARYING TRANSMISSION RATIO
Max Kimpflinger and Hans Joachim Schwerdhofer, Schweinfurt am Main, Germany, assignors to Fichtel & Sachs A.G., Schweinfurt am Main, Germany, a corporation of Germany
Filed Nov. 29, 1962, Ser. No. 240,804
Claims priority, application Germany, Dec. 22, 1961, F 35,619
2 Claims. (Cl. 74—752)

This invention relates to multiple speed hubs for a bicycle or like vehicle and more particularly to a multiple speed hub the transmission ratio of which varies automatically with the traveling speed of the vehicle.

The advantages of automatic transmissions in self-propelled vehicles are too well known to require enumeration. Multiple-speed transmissions for bicycles and similar vehicles are commonly arranged in the hub of a driven wheel such as the rear wheel of the bicycle. The automatic transmissions heretofore available for use in bicycles and of a size permitting installation in a wheel hub rely for actuation of a change in their transmission ratio on changes in the torque applied by a source of motive power such as the pedals of the bicycle.

The power provided by the muscles of a rider usually varies cyclically with each revolution of the pedals, and is rarely maintained uniform over a significant length of time. Automatic transmissions responsive to variation in input torque have therefore not been found fully satisfactory in bicycles because of undesired frequent changes in transmission ratio during pedaling.

An object of the invention is the provision of an automatic transmission installed in the hub of a bicycle or similar vehicle the transmission ratio of which changes responsive to the velocity of the vehicle. Because of the usual free-wheeling arrangement in a bicycle, the velocity of the bicycle changes less frequently and less abruptly than the torque provided by muscle power, and involuntary speed changes are avoided by changing the transmission ratio of the hub responsive to the traveling speed.

Another object of the invention is the provision of a centrifugal governor or actuator for changing the transmission ratio as the traveling speed exceeds a predetermined speed, or drops below a predetermined speed. The rotary speed of the wheels on bicycles or motor-assisted bicycles is relatively low under all normal operating conditions. In order to provide adequate forces for actuating a change in the transmission ratio, a centrifugal governor would require relatively large and heavy weights if operated at the speed of the associated wheel. Such weights are not readily accommodated in a bicycle wheel hub of desirable small dimensions. Since the governor has to rotate about a horizontal axis if installed in a wheel hub of conventional size and shape, it requires return springs for returning the weights to a position near the axis of rotation. Such springs further increase the bulk of the governor if the weights are heavy and the springs correspondingly strong.

A further object of the invention is the provision of a centrifugal governor or actuator which is readily installed in a portion of the cavity defined in a bicycle hub of usual dimensions, and yet develops adequate power for reliably bringing about a speed change in a multiple ratio transmission, also installed in the hub.

With these and other objects in view, the invention in one of its aspects provides a multiple speed hub having a driven member and a driving member with a multiple-ratio transmission interposed between the driven and driving members for rotating the driving member at one of the multiple transmission ratios responsive to rotation of the driven member, and with a centrifugal actuator connected to one of the members for joint rotation. The actuator is connected to the transmission in such a manner as to change the transmission ratio of the latter when the rotary speed of the actuator exceeds a predetermined speed.

Other features and many of the attendant advantages of this invention will be readily appreciated as the same becomes better understood be reference to the following detailed description of a preferred embodiment when considered in connection with the accompanying drawings wherein like reference numerals designate like parts throughout the figures thereof, and in which.

Figure 1:
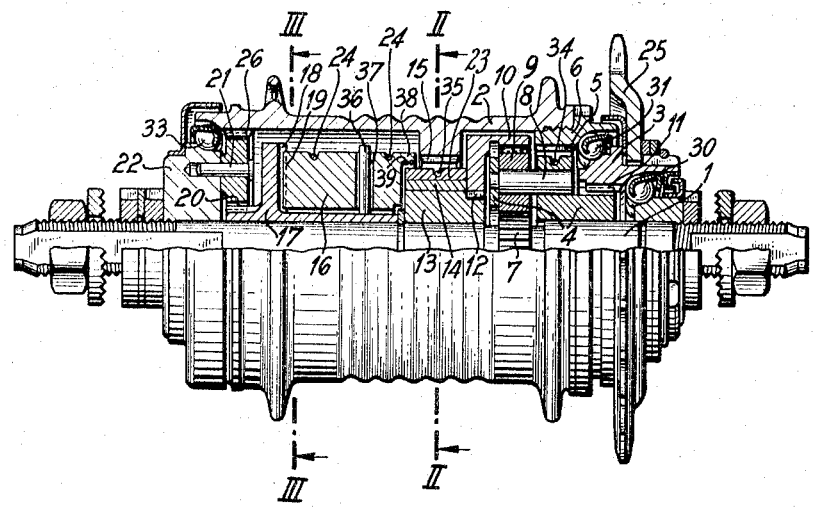
FIG. 1 is a side elevational view of a dual speed bicycle hub of the invention, one half of the hub being shown in axial section.

Referring now to the drawing in detail, there is seen a bicycle hub of conventional external appearance. The hub is mounted on a bicycle frame, not shown, by means of its stationary shaft 1. Most of the other operating elements of the hub are enclosed in a hub shell 2 coaxilly rotatable on the shaft 1. The hub shell is the driving output member of the hub and is normally connected to a wheel rim by a multiplicity of wire spokes, the rim and spokes not being illustrated.

The driven member or input member of the hub is a sprocket 25 which is fixedly fastened to a driver member 3. The driver member is rotatably mounted on the shaft 1 by means of an inter posed ball bearing 30. An annular bearing race member 6 firmly attached to the hub shell 2 is rotatably supported on the driver member 3 by a ball bearing 31. The axial end portion of the hub adjacent the sprocket 25 will be referred to hereinafter as the drive end, and other elements of the hub will be referred to accordingly for describing spatial relationships.

Planetary gearing is arranged in the hub shell 2 axially adjacent the sprocket 25 in a direction away from the drive end. The gearing includes a planet wheel carrier 4 connected to the driver member 3 by a claw coupling 11. The carrier 4 which is rotatable on the shaft 1 carries two circumferential pawls not themselves visible in the drawing, but substantially identical with the pawls 23 to be described hereinbelow. The pawls on the planet wheel carrier 4 are urged by a pawl spring 34 into engagement with a ratchet 5 on the bearing race member 6. The pawls together with the ratchet 5 provide a free-wheeling clutch.

The meshing gears of the planetary gearing include a sun gear 7 integral with the stationary shaft 1, and a plurality of planet gears 9 rotatable on respective shafts 8 fixed on the carrier 11 and simultaneously meshing with the sun gear 7 and a ring gear 10. Only one planet gear 9 and its shaft 8 are seen in the drawing.

Another claw coupling 12 connects the ring gear 10 with the portion 13 of a pawl carrier which is rotatably supported on the shaft 1 adjacent the planetary gearing in a direction away from the drive end. The outer circumferential portion 14 of the pawl carrier is circled by a wire spring 35 which urges two pawls 23 into engagement with an internal ratchet rim 15 on the hub shell 2. The pawls 23 together with the rim 15 constitute a second free-wheeling clutch.

Figure 2:
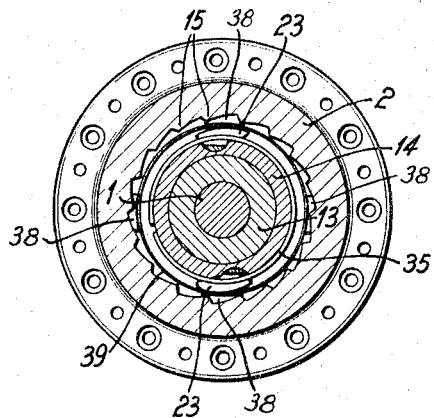
FIG. 2 shows the hub of FIG. 1 in radial section on the line II—II.
Figure 3:
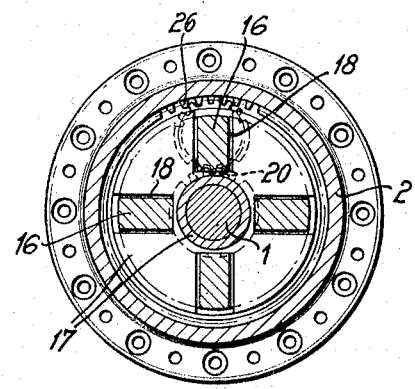
FIG. 3 shows the same hub in radial section on the line III—III.

A flanged sleeve 17 extends axially from the pawl carrier part 13 away from the drive end of the hub and toward the other hub end. It is freely rotatable on the shaft 1 and carries four centrifugal weights 16. The weights are axially and circumferentially secured, but radially slidable on respective guide pins 36 which extend from the sleeve 17 at right angles in a common radial plane. They actuate changes in the transmission ratio of the hub by their radial movement, as will presently become apparent. The weights are axially elongated, and the pins 36 are movably received in respective bores 37 of the weights near the drive end of the latter. The radial end face of each weight 16 at the drive end carries an integral projection 38. The projections 38 which are spaced from the shaft 1 jointly form an abutment for an open annular spring 39. The projections 38 and the spring 39 are axially coextensive with respective portions of the pawls 23. Two annular springs 24 which are much stronger than the spring 39 and envelop the four weights 16 normally hold the weights adjacent the tubular portion of the sleeve 17 as shown in the drawing. In this position, the spring 39 abuts radially inward against the pawls 23 and forces them into an inoperative position against the force of the pawl spring 35 as best seen in FIG. 2.

Four radial grooves 18 offset at right angles in the flange portion of the sleeve 17 receive respective radial ribs 19 on the weights 16, thus further securing the weights against rotary or axial movement relative to the sleeve 17 while permitting them to move radially. The end portion of the sleeve 17 remote from the drive end of the hub carries an integral gear rim which is meshingly engaged by a pinion 20 rotatable about the axis of a pin 21 parallel to the shaft 1 and radially spaced therefrom. The pin is mounted in an annular stationary bearing member 22 on which another axial end portion of the hub shell 2 is rotatably supported by a ball bearing 33. The pinion 20 also engages an internal gear rim 26 on the hub shell 2. The pinion 20 and the two gear rims meshingly engaged thereby constitute a gear train by means of which the sleeve 17 and the weights 16 are rotated jointly with the hub shell 2 at a speed much higher than that of the hub shell 2 or of the wheel rim with which the hub shell is normally connected.

In the condition illustrated in the drawing, motive power is transmitted from the sprocket 25 by means of the driver member 3, the claw coupling 11, the planet wheel carrier 4, the non-illustrated pawls, and the ratchet 5 to the hub shell 2 which thus rotates at the same speed as the sprocket 25. Rotation of the shell 2 is transmitted to the sleeve 17 by the pinion 20. The sleeve 17 with the weights 16 rotates much faster than the hub shell.

When the rotary speed of the shell 2 becomes sufficiently high, the centrifugal forces acting on the weights 16 in conjunction with the relatively weak springs 35 and 39 can overcome the restraint of the springs 24, and the weights 16 move radially outward on the pins 36 and in the grooves 18. As the projections 38 move apart, the spring 39 expands and permits the spring 35 to swing the pawls 23 into their operative position in which they engage the ratchet rim 15. Power is now transmitted from the sprocket 25 by means of the driver member 3, the claw coupling 11, the planet wheel carrier 4, the planet gears 9, the ring gear 10, the claw coupling 12, the pawl carrier 13, 14, the pawls 23, to the ratchet rim 15 and the hub shell 2 which rotates faster than the sprocket 25. Because of the higher speed of the ratchet 5 which is fixedly connected to the hub shell 2, the ratchet 5 overtravels the associated non-illustrated pawls. The hub shell is in its high-speed position.

If the traveling speed of the bicycle diminishes because of a decrease in power input or a change in the slope of the road traveled, the centrifugal forces acting on the weights 16 are overcome by the springs 24, and the pawls 23 are disengaged from the ratchet rim 15. Power transmission again is taken over by the non-illustrated pawls and the ratchet 5, and the hub reverts to the normal-speed position.

The automatic transmission of the invention can be arranged in a hub shell which is not bulkier than conventional dual speed hubs controlled by external speed changing devices under the rider's control. The transmission is relatively inexpensive to build because of the paucity of operating elements and their simplicity. It is reliable in operation and requires infrequent maintenance and repairs for the same reasons. All operating elements are contained in the hub shell and thus protected against mechanical damage and contamination. The provision of the afore-described gearing interposed between the hub shell and the centrifugal governor or actuating mechanism for changing the transmission ratio permits the governor to be operated at a relatively very high speed. The gearing occupies very little of the valuable space within the hub shell. The high governor speed makes it possible to employ centrifugal weights of relatively small mass and bulk which still reliably actuate changes in the transmission ratio of the hub at the relatively low velocity of a bicycle.

It should be understood of course that the foregoing disclosure relates to only a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. A multiple speed bicycle hub comprising, in combination:
   (a) a shaft having an axis;
   (b) a driver member mounted on said shaft for rotation about the axis thereof;
   (c) a hub shell mounted on said shaft and rotatable about said axis;
   (d) multiple-ratio transmission means mounted in said hub shell and interposed between said driver member and said hub shell for rotating said hub shell at one of the multiple transmission ratios of said transmission means responsive to rotation of said driver member;
   (e) centrifugal actuating means rotatably mounted in said hub shell and operatively connected to said transmission means for changing said one transmission ratio thereof to another one of said transmission ratios when the rotary speed of said actuating means differs from a predetermined speed;
   (f) motion transmitting means in said hub shell and interposed between the same and said actuating means for rotating the latter at a speed higher than the speed of said hub shell when said hub shell rotates;
   (g) wherein said transmission means include a plurality of meshingly engaged transmission members, one of said transmission members being connected to said driver member for joint rotation, and two free-wheeling clutch means respectively interposed between two of said transmission members and said hub shell, said two transmission members being operatively connected for simultaneous rotation at different speeds, and said actuating means include means for disengaging one of said free-wheeling clutch means when the rotary speed of said actuating means differs from said predetermined speed.

2. A hub as set forth in claim 1, wherein said motion transmitting means include a set of meshing gear means, a first one of said gear means being operatively connected to said actuating means for joint rotation therewith, a second gear means being operatively connected to said hub shell for joint rotation with the latter, and the third gear means being mounted on said shaft for rotation about an axis spaced from the axis of said shaft, said third gear means simultaneously meshing with said first and second gear means.

References Cited

UNITED STATES PATENTS

| | | | |
|---|---|---|---|
| 1,795,135 | 3/1931 | Molly | 74—336 |
| 2,147,750 | 2/1939 | Neracher et al. | 74—752 |
| 2,218,813 | 10/1940 | Cotterman | 74—752 |

DONLEY J. STOCKING, *Primary Examiner.*

DON A. WAITE, *Examiner.*

T. C. PERRY, *Assistant Examiner.*